Oct. 7, 1958

E. J. BUDINGER ET AL 2,855,252

CLINCHED BUTT BUSHING

Filed Sept. 29, 1954

INVENTOR.
EDWIN J. BUDINGER
PAUL A. KLINE
BY

*Eber J. Hyde*

ATTORNEY

United States Patent Office 2,855,252
Patented Oct. 7, 1958

2,855,252

CLINCHED BUTT BUSHING

Edwin J. Budinger, Fairview Park, and Paul A. Kline, South Euclid, Ohio, assignors to Clevite Corporation, Cleveland, Ohio, a corporation of Ohio Application September 29, 1954, Serial No. 459,053

4 Claims. (Cl. 308—237)

The present invention relates to a sheet metal bushing, and more particularly to a bushing having a clinched butt joint for securing the two ends of the sheet metal together in tubular form.

In the past attempts have been made to unite the edges of sheet metal by relative motion and edgewise compression to cause metal projections on one edge of the sheet metal to flow laterally into recesses in the opposite edge, thereby to lock the two ends together.

An excellent example of such an attempt is the device shown in the Wilmot Patent 578,801, issued in 1897, and considerable success has been had with the device shown in the Dekome Patent 2,283,918.

In 1897, when the Wilmot patent issued, the dimensional tolerances to which tubing had to be held were not nearly as exact as today's requirements. Today bushings are used in applications requiring high rates of relative rotation between the two parts which are separated by the bushing, and today's bushings require dimensional tolerances which were unheard of in 1897. Today bushings are being used in automatic transmissions for automobiles and in similar locations where, in order to meet production requirements, high speed, automatic production is essential, and dimensional tolerances on the order of .002 inch must be held in the I. D. and O. D. of the bushing.

To hold such tolerances in the mass production of round bushings is one of the objects of the present invention.

Another object of the invention is to manufacture a bushing having a clinched butt which will not open during ordinary handling, thereby maintaining from production until use the close tolerances to which the bushing was made.

A further object of the present invention is to inexpensively manufacture a clinch butt bushing which holds together better than prior art bushings of the same type, and which can have a centrally located oil groove which does not adversely affect the clinch.

It is another object of the invention to provide a clinched butt bushing to be assembled by relative motion and circumferential pressure between a tongue and a recess, wherein the tongue and recess are so shaped as to provide relatively easy sliding engagement, and to thereafter prevent the withdrawal of the tongue from the recess.

To accomplish the foregoing, the invention consists of a sheet of metal generally in tubular form, with its two terminal edges in butting relationship. A portion of the first of the two terminal edges defines a straight line having at each end only one recess inclined at an angle to a line perpendicular to the edge. A portion of the second of the butting edges defines a straight line having at each end only one tongue. Each of these two tongues is located in and substantially fills one of the two recesses. The portion of the first terminal edge which lies outside of the two recesses defines a straight line which is not co-linear with the straight line between the two recesses, and the portion of the second terminal edge outside of said two tongues defines a straight line which is not co-linear with the straight line between the two tongues.

Figure 1:
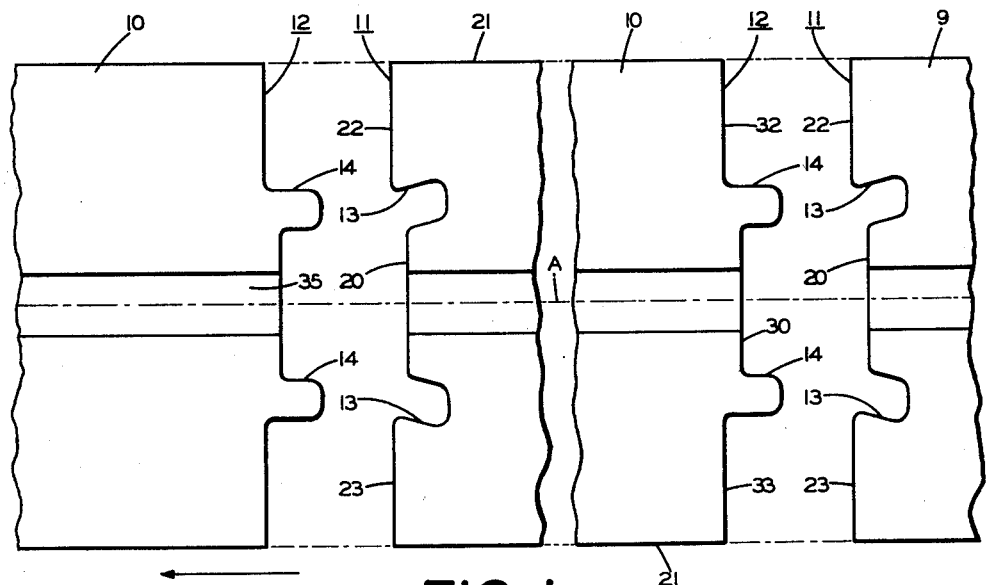
Figure 1 is a plan view of a flat strip of metal and showing a blank stamped from the strip to provide connecting means at each end of the blank.

Referring to the drawing there is shown in Figure 1 a strip of flat metal 9 which may be unrolled from a large reel of the metal stock and run through a punch press in the direction of the arrow. In the press there is a shear punch which upon each stroke severs from the strip a blank 10 of metal of proper length and configuration. The shear punch forms at the front and rear edges 11, 12 of the blank 10 recesses 13 and tongues 14 for clinching the edges of the blank together. For the sake of manufacturing economy it is preferable for each stroke of the shear punch to form the back edge 12 of one bushing blank 10 simultaneously with forming the front edge 11 of the next succeeding bushing blank 10, and at the same time severing the first blank from the long strip of metal 9.

In order that the blank 10 may be rolled into tubular form and its edges 11 and 12 tightly clinched together to form a bushing with closely held manufacturing tolerances which will not spring apart under ordinary handling, certain dimensional and positional relationships must exist between the recesses 13 and the tongues 14.

The first terminal or butting edge 11 of the blank 10 has a central straight line portion 20 at each end of which there is one recess 13 inclined at an angle α to an imaginary line perpendicular to the edge 20. Preferably each of the recesses 13 extends from one end of straight edge portion 20 at an angle toward the outside edge 21 of the bushing blank, though it is within the scope of the invention to have the recesses extend in a direction at an angle inwardly toward the center of the blank. It is also preferable to have the recesses located approximately at the one-third points across the width of the blank 10.

In addition to the central straight line portion 20 and the recesses 13 the first butting edge 11 also includes straight line portions 22 and 23 located outside of the two recesses 13. The two straight line portions 22 and 23 are co-linear, but they are off-set along the axis A of the blank 10 with respect to the straight line portion 20 so that the straight line defined by edge portions 22 and 23 is not co-linear with the straight line defined by edge portion 20; the amount of the off-set $f$ between the two straight lines bears a relationship to the angle α of the recess 13 and to the width $w$ of the recess.

The second terminal or butting edge 14 has a central straight line portion 30 at each end of which there is a tongue 14 extending outwardly from the blank 10 in a direction substantially perpendicular to the edge. The tongues 14 are located approximately at the one-third points across the width of the blank 10 so that, when the blank is formed into a tubular shape and prior to forcing the tongues 14 in the recesses 13, the tongues and recesses will have the positional relationship shown in the left hand portion of Figure 1.

In addition to the central straight line portion 30 and the tongues 14 the second butting edge 12 also includes straight line portion 32, 33 located outside of the tongues 14. The two straight line portions 32, 33 are co-linear, but they are off-set along the axis A of the blank 10 with respect to the straight line portion 30 so that the straight line defined by the edge portions 32, 33 is not co-linear with the straight line defined by edge 30; the amount of the off-set in the second butting edge 12 being substantially equal to $f$, the amount of off-set between the straight lines defining the first butting edge 11. The direction of the off-set in the second butting edge 12 is complementary to the direction of the off-set in the first butting edge 11 so that when the two butting edges 11 and 12 are brought together they will closely engage each other completely across the joint thus formed, as shown in Figure 2.

In addition to the aforesaid relationships, it is desirable, prior to forming, to have the straight tongue 14 the same length as the inclined depth of the recess 13, and the width of the tongue should be equal to the width of the recess. Thus, as the straight tongues shown in Fig. 1 are forced into the inclined recesses they are bent sideways and completely fill the inclined recesses, forming a tight smooth joint. The process shown and described in the Dekome Patent 2,283,918 may be used for forcing the tongues 14 into the recesses 13.

Figures 2, 3:
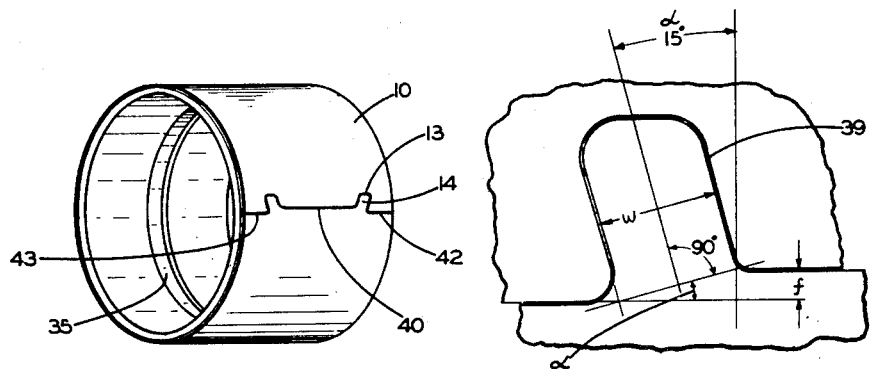
Figure 2 is an isometric view of the blank of Fig. 1, clinched into a tubular bushing.
Figure 3 is a greatly enlarged view showing one of the means for clinching together the two ends of the bushing.

Figure 2 shows the bushing assembled in tubular form, and shows an internal oil groove 35 located between the clinches where it does not interfere with the tight grip of the clinched portions.

Figure 3 is a view on a greatly enlarged scale showing the relationships between the various portions of the clinch necessary in order to obtain from mass-produced bushings consistently tight joints held to close I. D. and O. D. tolerances, and which will maintain their tight clinch and dimensional tolerance throughout the handling necessary between the production of the bushing and its installation into a motor or the like.

It has been found that the best angle $\alpha$ for the direction of each recess 13 is about 15 degrees with respect to an imaginary line perpendicular to the butting edge of the bushing, and that it should be about .1 inch wide and have substantially parallel sides. The tongues also should have parallel sides, and they should be the same width as the recesses. The straight parallel sides of the tongue are important as it facilitates proper bending of the tongue as it is pressed into the recess. In the prior art the tongues were wider at their base, thereby reducing the amount of bending at the base where maximum bending is desired. The device of the present invention provides a much better clinching action than prior types of clinches, and it is believed that one of the important reasons for it is the straight, parallel sides of both the recess and the tongue with maximum bending of the tongue adjacent its base.

As shown in Fig. 3, the tongue is bent sideways as it is pushed into the recess. In order to pull the tongue out of the recess the metal in the tongue must be deformed tending to straighten out the tongue, and as the tongue tends to straighten out its inside edge 39 is restrained by the wall of the recess, thereby resisting the straightening of the tongue. Prior clinches have had the tongue and recess designed so that the metal in the tongue had to bend as it was withdrawn but the wall of the tongue was not braced and held by the wall of the recess, and it thereby permitted the tongue to deform much more easily than the tongue of the present invention.

It is important that the joint define two lines, the first being the straight line 40 between the clinches and the second being the two straight line portions 42, 43 which are off-set from the line 40. The amount of off-set $f$ is dependent upon the angle $\alpha$ of the recess and the width $w$ of the recess. For the example shown where the recess is .1 inch wide and at an angle of 15 degrees the off-set should be about .025 inch. With this relationship the tongue will slide into its recess relatively easily, but is hard to retract. In Fig. 3 it will be seen that the proper amount of off-set may be expressed as $w \sin \alpha = f$. This relationship holds for smaller and larger bushings.

The bushing which has been described may be made of a single lamination of material, or it may be made of a bimetal, as shown in Fig. 2, where the outer lamination is steel or the like for strength and the inner lamination is a bearing material. As known in the bearing art the two laminations are secured together. The clinch of the present invention is outstanding for bimetal bushings in that the thin layer of bearing metal has less tendency to separate from the steel backing due to forming the flat sheet into a clinched bushing.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A clinched butt bushing comprising a sheet of metal in tubular form with its two terminal edges in butting relationship, a central portion of the first of said two terminal edges defining a straight line terminating at each end in a recess the walls of which are substantially parallel and are inclined at an angle to a line perpendicular to said straight line, and a central portion of the second of said butting edges defining a straight line terminating at each end in a tongue, each said tongue being located in and substantially filling one of said two recesses; the portion of the first terminal edge outside of said two recesses defining a straight line which is off-set with respect to the straight line central portion between the two recesses, and the portion of the second terminal edge outside of said two tongues defining a straight line which is off-set with respect to the straight line between the two tongues.

2. A clinched butt bushing as set forth in claim 1, further characterized by the portion of the first terminal edge located between the two recesses being recessed into the body of the bushing further than the first terminal edge located outside of said two recesses.

3. A clinched butt bushing comprising a sheet of material in tubular form with its two terminal edges in butting relationship, the central portion of the first of said two edges defining a straight line terminating in two spaced apart recesses the sides of which are parallel and inclined at a given angle to a line perpendicular to said edge, and the other portion of the first of said two edges defining a second straight line offset with respect to said first straight line, the central portion of the second of said two edges defining a straight line terminating in two spaced apart tongues the sides of which are parallel and inclined at the given angle to a line perpendicular to said edge, each of said tongues being located in and substantially filling one of said two recesses, and the other portion of the second of said two edges defining a second straight line offset with respect to said first straight line by an amount equal and complementary to the offset between the two straight lines defined by the first of said two edges.

4. A clinched butt bushing comprising a sheet of metal in tubular form with its two terminal edges in butting relationship, a central portion of the first of said two terminal edges defining a straight line terminating at each end in a recess of width $w$ having parallel edges inclined at an angle $\alpha$ to a line perpendicular to said straight line, and a portion of the second of said butting edges defining a straight line having at each end a tongue of width $w$ having parallel edges, each said tongue being located in and substantially filling one of said two recesses; the portion of the first terminal edge outside of said two recesses defining a straight line offset circumferentially around the bushing by an amount $f$ from the said straight line between the recesses, and the portion of the second terminal edge outside of said two tongues defining a straight line offset circumferentially around the bushing by an amount $f$ from the straight line between the two tongues, the amount of said offset being substantially equal to $w$ sine $\alpha$.

References Cited in the file of this patent

UNITED STATES PATENTS

| | | |
|---|---|---|
| 578,801 | Wilmot | Mar. 16, 1897 |
| 1,016,584 | Shepherd et al. | Feb. 6, 1912 |
| 1,213,684 | Osterholm | Jan. 23, 1917 |
| 1,298,100 | Royce | Mar. 25, 1919 |
| 2,616,771 | Metzgar | Nov. 4, 1952 |
| 2,762,118 | Shaw et al. | Sept. 11, 1956 |